United States Patent [19]

Thaddey

[11] Patent Number: 4,605,300

[45] Date of Patent: Aug. 12, 1986

[54] DEVICE FOR EXPOSING AND SEPARATING PHOTOGRAPHIC STRIP-MATERIAL FOR THE PRODUCTION OF MARGINLESS COPIES

[75] Inventor: Kurt Thaddey, Buchs, Switzerland

[73] Assignee: Prontophot Holding AG, Dübendorf, Switzerland

[21] Appl. No.: 659,776

[22] Filed: Oct. 11, 1984

[30] Foreign Application Priority Data

Oct. 12, 1983 [CH] Switzerland .................... 5551/83

[51] Int. Cl.$^4$ ............................................. G03B 29/00
[52] U.S. Cl. ........................................ 355/29; 355/74
[58] Field of Search ...................... 355/29, 28, 52, 53, 355/54, 56, 74

[56] References Cited

U.S. PATENT DOCUMENTS

| | | | |
|---|---|---|---|
| 2,927,503 | 3/1960 | Zollinger | 355/28 |
| 3,467,469 | 9/1969 | Hastings et al. | 355/28 |
| 3,500,734 | 3/1970 | Lewis et al. | 355/28 |
| 3,503,317 | 3/1970 | Johnson | 355/53 |
| 3,689,149 | 9/1972 | Livingood | 355/54 |

FOREIGN PATENT DOCUMENTS

| | | | |
|---|---|---|---|
| 142334 | 7/1935 | Austria | 355/74 |
| 2912548 | 10/1979 | Fed. Rep. of Germany | 355/74 |

*Primary Examiner*—Monroe H. Hayes

*Attorney, Agent, or Firm*—Watson, Cole, Grindle & Watson

[57] ABSTRACT

A roller-blind shutter (32) comprises two shutter-curtains (35,36) with accompanying shutter-rollers (33,34) adapted to be driven by stepping motors (M3,M4). The strip-material (6) is transported and positioned, along the path of travel of the said shutter-curtains, by a positioning roll (14) also driven by a stepping motor (M2). The stepping motors (M2,M3,M4) are controlled digitally by pulses from positioning devices. Prior to exposure of a section of strip by a projected picture (31), the strip-material is positioned in such a manner that its leading transverse edge (6k) is spaced by half a frame-length from the optical copying axis (OA). In order to make an exposure, the said shutter-curtains are moved consecutively in the same direction, so that the closing edges (35k,36k) thereof expose and then cover the said section of strip. The one edge (31uk) of the exposed picture (31) is formed by the transverse edge (6k) of the strip-material (6), while the opposing edge (31ok) is masked by the shutter-curtain (35) located on the other side of the optical copying axis (OA). In the exposure-position, the closing edge (35k) of this shutter-curtain (35) is spaced by half a frame-length from the optical axis of the picture (OA). The device may be adapted to different frame-lengths by altering the program of the positioning devices.

18 Claims, 5 Drawing Figures

DEVICE FOR EXPOSING AND SEPARATING PHOTOGRAPHIC STRIP-MATERIAL FOR THE PRODUCTION OF MARGINLESS COPIES

BACKGROUND OF THE INVENTION

1. Field of the Invention

The invention relates to a device for exposing photographic stripmaterial in consecutive sections of predetermined format and for separating the exposed sections, into marginless copies, for further processing the device having an exposure platform perpendicular to the axis of an optical copying device; a roller-blind shutter located immediately in front of the exposure platform, with two curtains, each adapted to be moved along a path by means of a curtain-roller, and each comprising a closing edge running at right angles to the path and adapted to move across the exposure-platform; and a feed-device for the strip-material, the feed-device containing a positioning roll operated by a drive-motor, whereby the strip-material is adapted to be fed along a track running along the path of the shutter-curtains, across the exposure-platform, to a separating device, the cutting location of which is at a fixed, predetermined distance from the optical copying axis.

2. The Prior Art

Devices of this kind are known in sundry design-variants. For the purpose of exposing the photographic material, a simple flap may be used, but normally a central or roller-blind shutter is used. Since, in projecting the picture to be copied by the copying devvice and also, in particular, in automatically positioning the photographic material for exposure, deviations from an ideal position yielding a sharply defined copy are unavoidable, the optical projection is always selected somewhat larger than the desired picture-format, and the picture is defined upon the photographic material by a mask, in order to allow for the optical and mechanical tolerances arising. The masks are either stationary mechanical restrictions, such as thin sheet-steel frames which must be changed each time the picture-format is changed, or are mobile mechanical restrictions, such as sheet-metal strips adapted to move in relation to each other which, when the picture-format is changed, maybe adjusted to the desired format manually or, more particularly, automatically by high-speed exposure devices.

In producing marginless copies from photographic strip-material, such masking is simpler per se, since masking of the longitudinal edges of the picture may be eliminated by using strip-material of a width corresponding to that of the desired picture-format, and the pictures on the strip material need be masked only at the transverse edges. However, there is also the requirement that the pictures be closely adjacent on the strip-material and that they neither overlap at the transverse edges, which would produce black transverse strips, nor are separated from each other, which would produce white strips, so that, in parting off, a single cut between two adjacent pictures will, in fact, make it possible to obtain marginless copies.

It has been found advantageous to design automatic, strip-material-processing copying devices, so-called "printers", in such a manner that it is not the finish-processed strip-material that is cut into separate copies; instead, each exposed section is immediately cut from the strip-material and is passed on for further processing into a copy. This greatly simplifies the co-ordination of copies and original and also makes it possible to interrupt the operating sequence, without delaying the finishing of copies already exposed. Sine the separating device can be arranged only in the feed-direction of the strip-material, after the shutter and the exposure-platform with the mask, the strip-material, after a section has been exposed, must first be advanced into the separating device and be correctly positioned therein, and must then, for the purpose of exposing the next section, be moved back to the exposure-platform and must be repositioned for accurate masking of the transverse edges. If the picture-format length is variable, it must also be possible to adjust the mask accurately. The accuracy of the strip-material feed, and that of the mask adjustment, must be within ±0.1 mm, since otherwise the aforesaid black and white transverse edges may arise. Units with constant picture-format length require precision-mechanisms and, if they are to be completely automatic, correspondingly accurate controls, and the cost of such mechanisms and controls increases considerably if the picture-format length is to be optional.

It will be understood from the foregoing that knowndevices of this kind are relatively costly and do not always ensure that no copies, or at least very few, are scrapped because of transverse edges.

It was therefore the purpose of the invention to provide a device for exposing and separating photographic strip-material, of the type mentioned at the beginning hereof, by means of which, without any external intervention in the design, and solely by programming, sections of strip-material can be exposed at separated to produce marginless, especially without unwanted black or white strips at the transverse edges, of any desired picture-format length up to the maximal dimensions of the device. The design of this device is to be relatively simple, and the mechanical design in particular is to be such that the necessary accuracy can be obtained by the use of a control consisting of micro-processors, more particularly a digital control. it is also to be possible to use photographic strip-material of different widths, so that the device may be used for any desired pictureformat, up to a maximum determined by the design itself.

SUMMARY OF THE INVENTION

The device contains a roller-blind shutter which, according to the invention, also serves as the picture-defining mask. This eliminates a separate mask having moving parts and the necessary control device for adjusting the mask. Thus, from the point of view of mechanical design and the amount of controls, the device according to the invention is simpler than a device having a moving mask. The curtain rollers are operated by drive-motors. The photographic strip-material is transported by a roll hereinafter referred to as the positioning roll and which is also operated by a drive-motor through a stripmaterial positioning device. Before each exposure, and with the roller-blind shutter closed, the strip-material is positioned by rotating the positioning roll in such a manner that its leading transverse edge, in the direction of travel, is spaced from the optical copying axis by half the length of the selected picture-format, in the direction of the separating unit, and the leading edge of the picture need not therefore be masked. The drive-motors for the curtain-rollers are controlled by a curtain-positioning device in such a manner that the curtain more remote from the separating device assumes an exposure position in which the closing edge of this shutter-curtain is spaced from the optical copying axis by half a picture-format length in the direction of the separating device, in order to mask the following picture edge. After a section of the strip has been exposed, the strip-material is advanced, by rotating the positioning roll, by one feed-length, which is equal to the sum of the half picture-format length and the fixed distance between the cutting location of the separating device and the optical copying axis. As a result of this, the following picture-edge masked by the shutter-curtain is located accurately at the cutting location of the separating device, and the exposed section of strip is cut off at the correct location. Thus for masking, exposing and separating the sections of strip, use is made only of positioning by means of rotating rolls or rollers, and it is known that these are particularly simple to design with adequate accuracy. It is desirable for the drive-motors for the curtain-rollers of the roller-blind shutter and the positioning roll to be stepping motors. This makes it possible to use a simple digital control assembled from commercially available microprocessors, the nominal positions to be assumed by the strip-material and the shutter-curtains being given in the form of distances to be travelled which can be expressed by numbers of steps, dependent upon the desired frame-length as the sole variable.

DESCRIPTION OF THE DRAWINGS

The invention will be explained hereinafter in greater detail, entirely by way of example, in conjunction with the drawings attached hereto, wherein:

FIGS. 2-1 and 2—2 show a diagrammatical circuit-arrangement serving to illustrate a control arrangement governing the operating sequence of the device;

DETAILED DESCRIPTION OF THE PREFERRED EMBODIMENT

Figure 1:
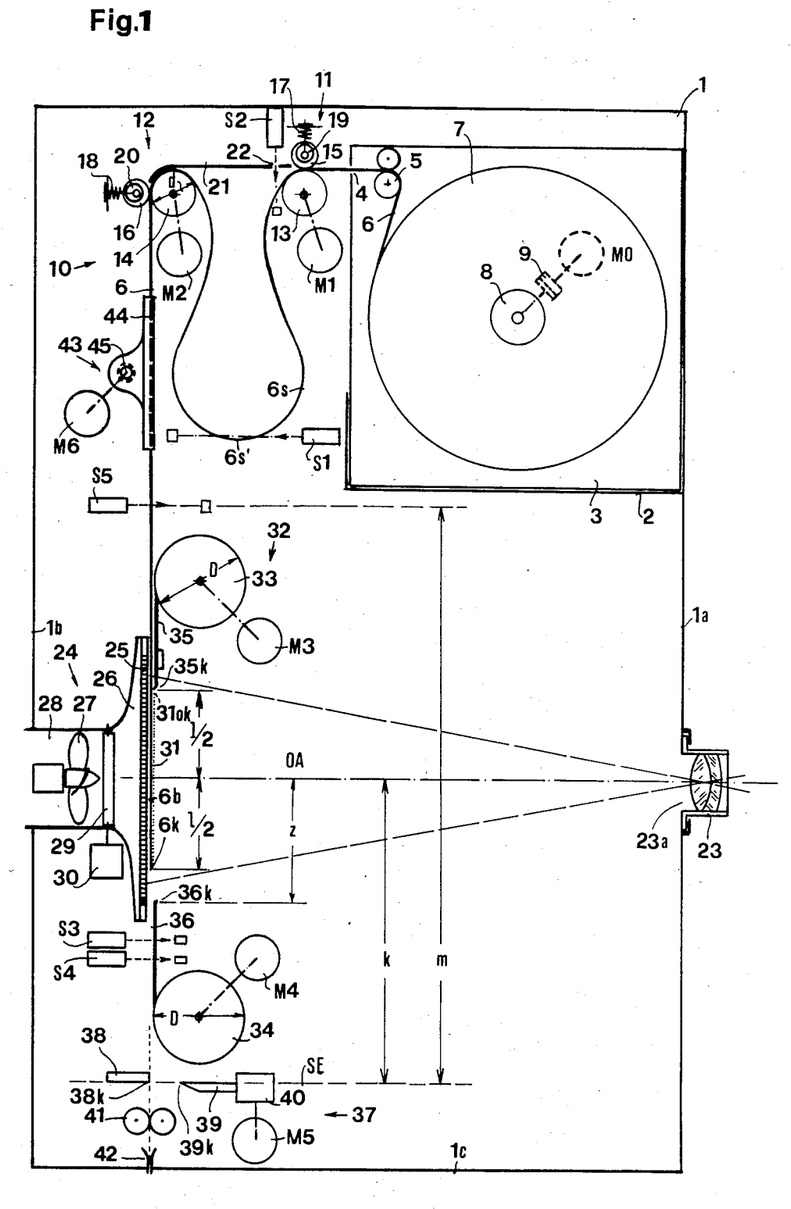
FIG. 1 is a diagrammatical representation of the design of a device according to the invention.

The device illustrated diagrammatically in FIG. 1 for exposing and separating consecutive sections of photographic strip-material, more particularly copying paper, comprises a cupboard-like housing 1 which may be part of a compact copying unit, the front door thereof, as is usual with such units, being in the form of a light-proof door, in order to provide access to the interior of the housing. Located at the top right-hand side of the housing is a slide-in compartment 2 for the accommodation of a light-proof cassette 3 containing a roll 7 of photographic strip-material 6, the cassette comprising a lateral slot 4 for the strip-material as it leaves roll 7 and passes over a deflecting roller 5. Shaft 8, in cassette 3, which carries roll 7, is adapted to be coupled, through a slipping clutch 9, to an electric motor MO for rewinding strip-material. It is desirable for the shaft 8 to carry one part of the clutch and for the drive-shaft of rewinding motor MO, arranged at the back of the compartment, to carry the other part of the clutch, the latter being designed in such a manner that the connection between shaft 8 and rewinding motor MO can be made only by inserting cassette 3 into compartment 2. The cassettes are interchangeable and it is therefore a simple matter to select one containing strip-material of the width of the desired picture-format.

Arranged in housing 1, to the left of compartment 2 is a two-element feed-device, marked 10 as a whole, which takes strip-material 6 from roll 7 and passes it on. Elements 11 and 12 of the feeddevice are of substantially the same design, each comprising a roll 13,14 arranged rotatably in stationary bearings and driven by an electric motor M1,M2, and a pressure-roll 15,16 adapted to be raised manually from the driven roll 13,14, e.g., by means of an eccentric 19,20, against the force of a pressure-spring 17,18. As usual, the rolls have non-slip surfaces, e.g., they may be coated with rubber. Feed-elements 11,12 are arranged in such a manner that strip-material 6, emerging from cassette-slot 4 is passed, by first feed-element 11, close to compartment 2, horizontaly onto driven roll 14 of second feed-element 12, whence is passes downwardly after suitable deflection. Extending between feed-elements 11,12 is a guide 21 which serves, on the one hand, to deflect the strip-material from the horizontal to the vertical feed-direction and, on the other hand, to form, from the strip-material drawn from cassette 3, a loop 6s hanging freely down, when, during feeding, driven roll 13 of first feed-element 11, which will hereinafter also be referred to as feed-roll 13, is rotated faster than driven roll 14 of second feed-element 12, hereinafter also referred to as positioning roll 14. Loop 6s of strip-material is intended, when the device is in operation, to maintain a predetermined length which is detected by first sensor S1 which is associated with apex 6s' of the loop and is in the form of an IR light-barrier, for example. A second sensor S2, also in the form of an IR light-barrier, is located, as seen in the direction of travel of the strip-material, immediately after first feed-element 11 and serves to detect the leading transverse edge of the strip-material, as described hereinafter in greater detail. The IR light-ray of sensor S2 can pass through an aperture 22 in guide 21.

First feed-element 11, close to slide-in compartment 2, serves to draw strip-material 6 from cassette 3 and to maintain loop 6s. Drive-motor M1 for feed-roll 13 may be an asynchronous motor, the forward and reverse operation of which is controlled by signals released by sensor S1. Second feed-element 12, more remote from compartment 2, serves to feed strip-material 6 and to position it accurately for an exposure. Drive-motor M2 is a stepping motor which can be switched over to two rotational speeds and is operated with full steps. The circumference of positioning roll 14 is exactly 25/6" and the release per step 1/48", in order to ensure adequately accurate positioning of the strip-material to be exposed.

Located below slide-in compartment 2 in FIG. 1, in right-hand lateral wall 1a of housing 1 is an aperture 23a to which an objective 23 may be fitted as a part of a conventional optical copying device. Pertaining thereto, but not shown in the drawing, is a copying window which is arranged, externally of housing 1, at a fixed predetermined distance from lateral wall 1a and accommodates the picture to be copied, e.g. a negative colour-film.

Arranged on opposing lateral wall 1b of housing 1 is an exposureplatform 24 of substantially known design. Front plate 25 of the platform, accommodating section 6b of the strip-material which is to be exposed, has its whole surface perforated and, located at the back is a vacuum-chamber 26 which can be evacuated by a fan 27, to hold the strip-material section 6b which is to be exposed, and which is positioned on front plate 25, by suction, securely in the exposure position and to keep it flat. In order to allow strip-material 6 to move easily across exposure-platform 24, it is better not to shut off the fan, but to arrange between it and vacuum-chamber 26, in evacuating duct 28, a shutter consisting, for example, of a series of slats 29 adapted to pivot about their longitudinal axes, the shutter being adapted to be opened by an electrical drive 30, such as a motor or a solenoid, by control signals, in order to such the strip-material to front plate 25, and to be closed in order to release it, the fan 27 remaining switched on.

Figures 3, 4:
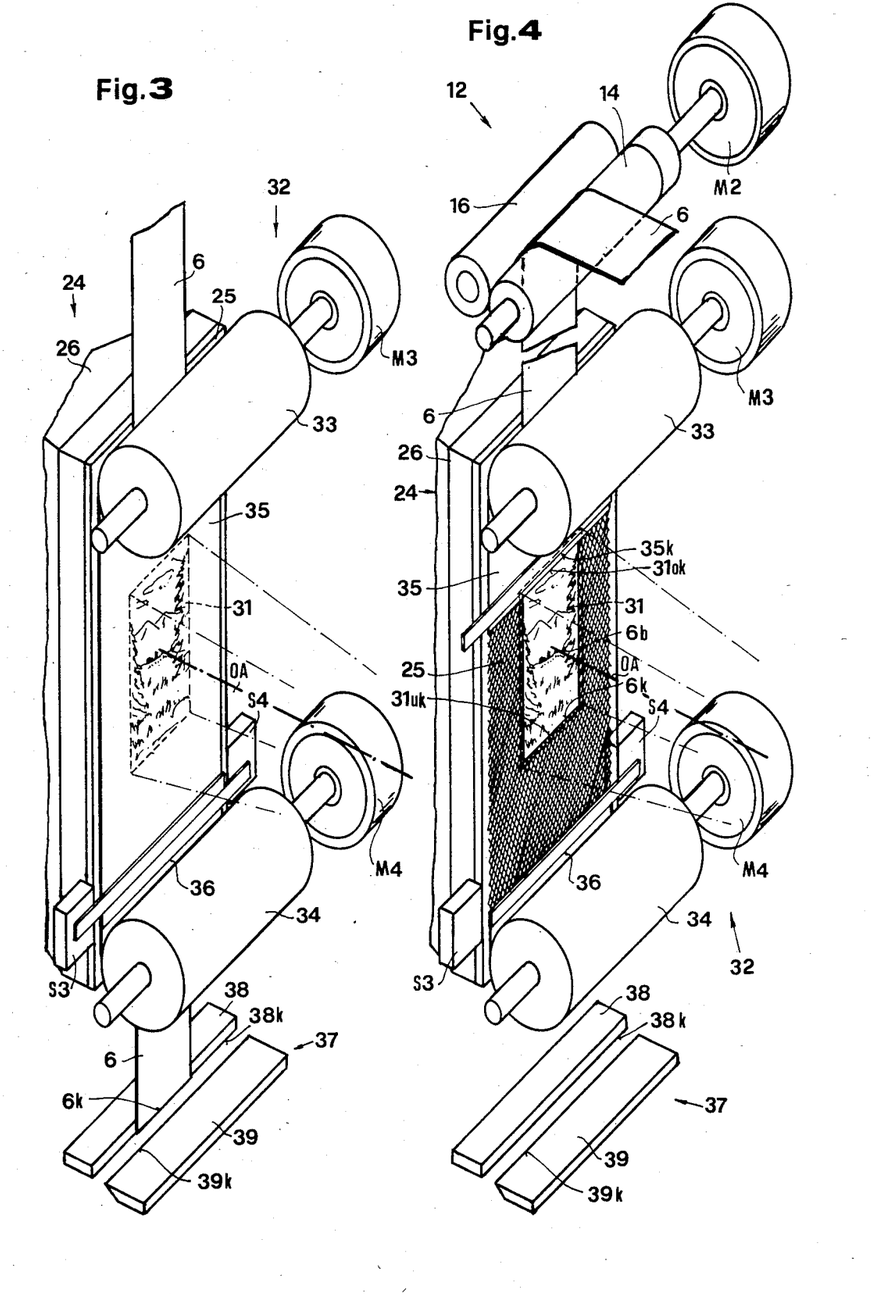
FIG. 3 is a perspective view of an exposure-platform with the roller-blind shutter closed, prior to exposure of a section of the strip-material.
FIG. 4 shows the arrangement according to FIG. 3 with the first shutter-curtain raised for exposing and masking.

As also shown in FIGS. 3 and 4, a roller-blind shutter is located immediately in front of exposure-platform 24, rollers 33,34 thereof being arranged in such a manner that the path of shutter curtains 35,36 runs along the path or travel of strip-material 6. In the device illustrated, in which the path of travel is vertical, first roller 33 is arranged above exposure-platform 24, while second roller 34 is arranged thereunder. Shutter-curtains 35,36 each have a closing edge 35k,36k which runs at right angles to the path of movement of the relevant shuttercurtain and is adapted to move across the exposure platform.

According to the invention, roller-blind shutter 32 also serves as a picture-mask for marginless copies. In the embodiment illustrated, the two shutter-curtains 35,36 are located, when the closed roller-blind shutter is in its neutral position, in their lower terminal positions, closing edges 35k,36k of shutter-curtains 35,36 being at a distance z, which is somewhat more than half the maximal frame-length $l_{max}$, below optical copying axis OA. In order to expose a section of strip-material 6, upper shutter-curtain 35 is pulled up, but only far enough for its closing edge 35k to assume an exposure position in which the closing edge 35k masks the upper edge 31 of picture 31 indicated in FIG. 1 by a dotted line (FIGS. 1 and 4). With a time-delay equal to the desired exposure-time, lower shutter-curtain 36 is also moved upwardly until the roller-blind shutter is closed, after which the two shutter-curtains 35,36 are returned together, with the roller-blind shutter closed, to their neutral positions. The entry of the shutter-curtains into their neutral positions is monitored by sensors S3 and S4 which may be IR light-barriers. For the purpose of driving shutter-curtains 35,36, each curtain-roller 33,34 is coupled to a stepping motor M3,M4.

In view of the accuracy required, shutter-curtains 35,36 are made of spring-steel sheet and are thus free of distortion, and the circumference of curtain-rollers 33,34 that each rolled-up curtain bears, in one layer and without overlap, against the surface of the roller. Closing edge 35k of upper, first shutter-curtain 35 is smooth and sharp and lies upon section 6b of the strip material to be exposed, in order to ensure a sharp picture-limit. Shutter-curtains 35,36 are preloaded as usual with springs. In the preferred embodiment illustrated in FIG. 1, rollers 33,34 are of the same diameter, diameter D of the rollers being twice diameter d of positioning roll 14, driven by stepping motor M2, of feed-device 10, so that the circumference of each roller 33,34 amounts to exactly 25/3". As in the case of positioning roll 14, the release per step for rollers 33,34 is 1/48", but the latter are driven with half steps.

Arranged below roller-blind shutter 32 and exposure platform 24 is a separating device 37 comprising a stationary blade 38 and a mobile blade 39, the latter being driven, for example, by an electric motor M5 and a suitable transmission 40. Blades 38,39 are arranged in such a manner that their cutting edges 38k,39k lie in a cutting plane SE at right angles to the path of travel of strip-material 6 and at a distance k from optical copying axis OA. Cutting edge 38k of stationary blade 38 moreover lies directly in the path of the strip-material so that, as it advances, it bears against the cutting edge and ensures that the exposed section is separated with a clean cut. Also arranged in the path of travel of strip-material 6, below stationary blade 38, is a pair of conveyor-rolls 41 and, in bottom 1c of the housing, a slot 42 through which the exposed and separated section of strip-material material can be removed from the housing and passed to a developing unit for further processing.

A further sensor S5, in the form of an IR light-barrier arranged above roller-blind shutter 32, scans the path followed by the strip-material and reports, by a signal-change, when, during the threading-in of the strip-material, leading edge 6k thereof is at a fixed predetermined distance m from the cutting plane SE, the distance preferably corresponding to a whole number of steps of stepping motor M2 in the second feed-element 12.

The components of the device coming into contact with the stripmaterial, more particularly rolls 13,14,15 and 16 of feed-device 10, front plate 25 of exposure-platform 24, roller-blind shutter 32, and blades 38,39 of separating device 37, are of a size corresponding to the anticipated maximal picture-format, and thus to the maximal width of the photographic strip material to be used and, together with cassette 3, are arranged in housing 1 substantially symmetrically with the vertical plane containing optical copying axis OA, in order to ensure that strip-material 6 moves along a path which is sufficiently symmetrical laterally to this vertical plane. For accurate guidance of the strip-material along such a path of travel, one or more guide-devices 43 are arranged at suitable points thereof, more particularly between feed-device 10 and exposure-platform 24, jaws 44 thereof guiding the longitudinal sides of the strip-material and being adjustable, symmetrically with the vertical plane containing optical copying axis OA, to the width of the strip-material in use. To this end, guide-jaws 44 are preferably arranged upon a spindle 45 with sections threaded in opposite directions, so that rotating the spindle in one direction opens the jaws and rotating it in the other direction closes them. Spindle 45 is driven by an electricmotor M6, and adjustment of jaws 44 to width b (FIG. 2) of the photographic strip-material used is effected automatically by incremental measurement of spindle revolutions.

After a cassette 3 has been introduced into slide-in compartment 2, after strip-material 6 has been placed in first feed-element 11, and after the front wall of the housing has been closed, the device operates fully automatically, stepping motors M2,M3,M4, in particular, permitting the use of very simple digital controls to achieve the necessary accurate feeding of the strip-material through feed-device 10 and during exposure and masking with roller-blind shutter 32, the controls including essentially simple positioning procedures, such as positioning the cassette material drawn from cassette 3 upon front plate 25 and in separating device 37 and, for exposing and masking, permitting adjustment of shutter-curtains 35,36 from the lower closed position to the upper closed position.

Figure 21:
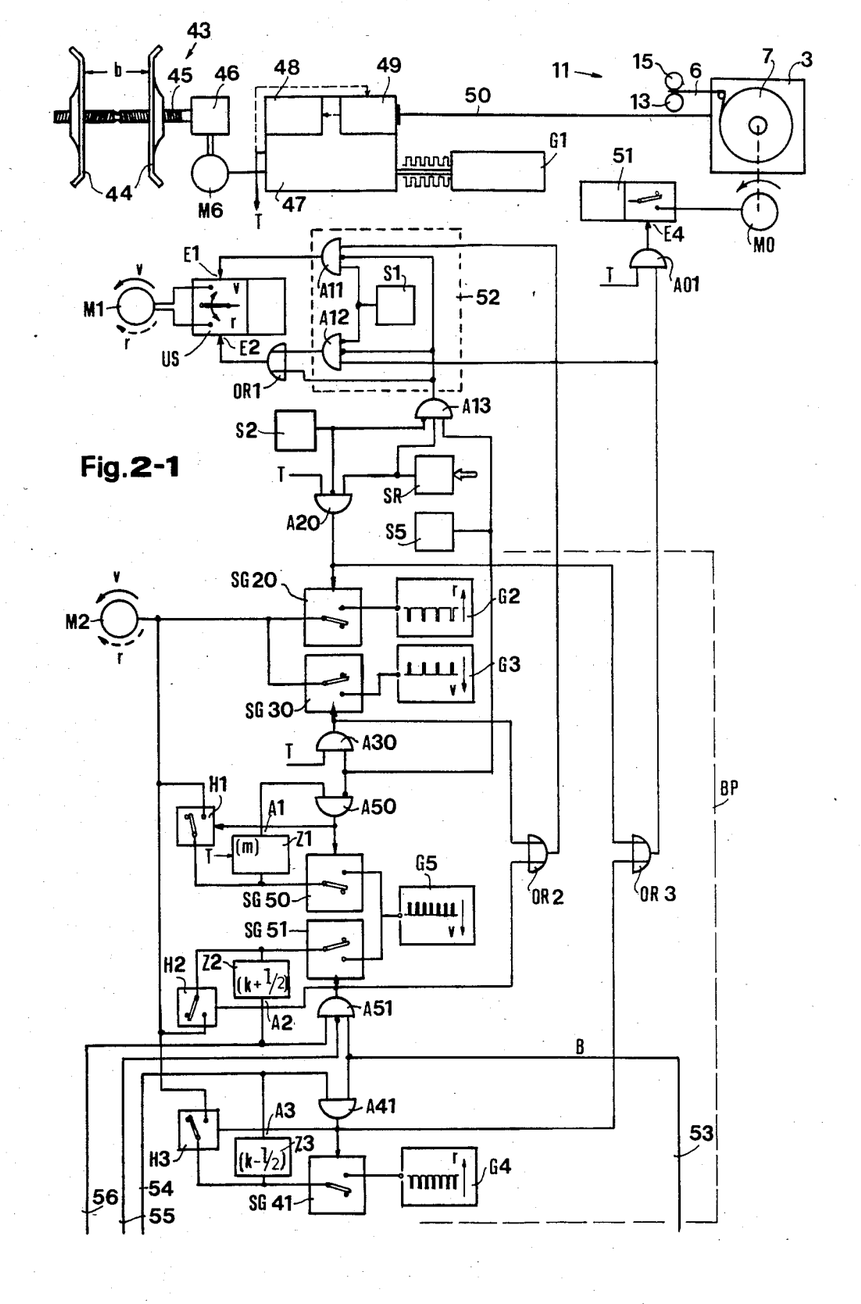
Figure 22:
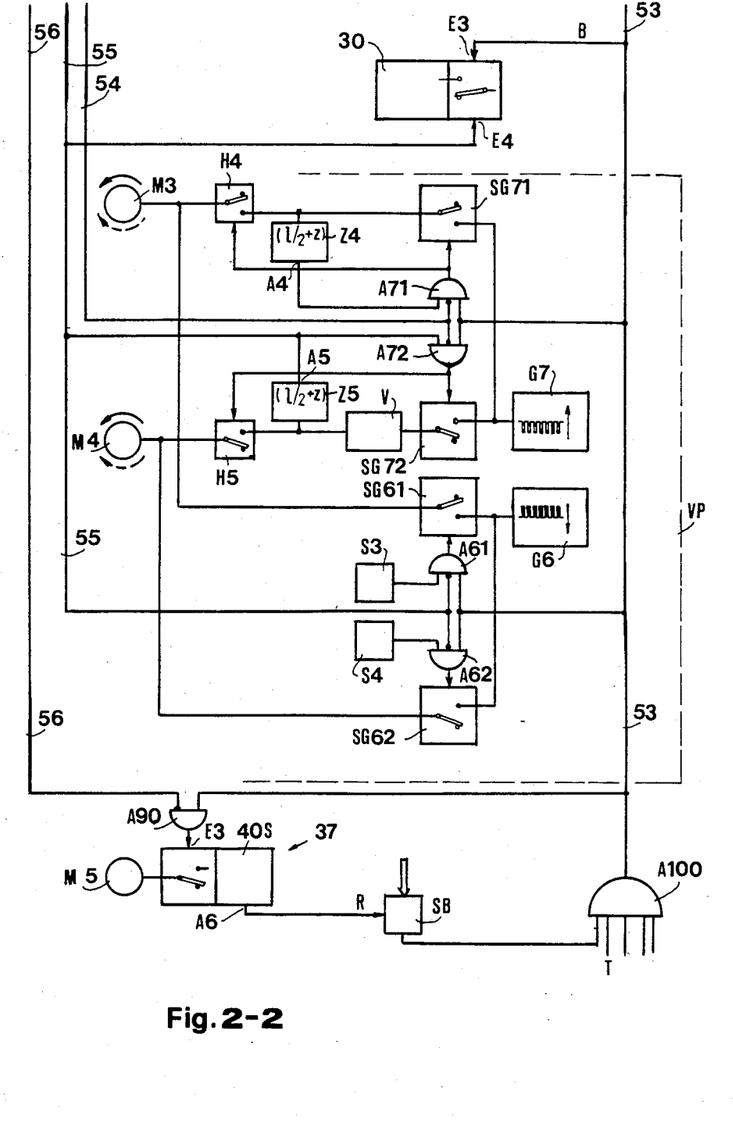

The automatic sequences will be described hereinafter in greater detail, in conjunction with FIGS. 2-1 and 2-2 which illustrate diagrammatically a circuit arrangement for the control-devices of individual drive-motors M0 to M6, serving to explain the sequences.

Positioning of the Guide-Devices 23

In the case of the control-device illustrated in FIGS. 2-1, it is assumed that guide-devices 43 provided are adapted to be driven by stepping motors M6 and that no guide-device is needed between slide-in compartment 2 and first feed-element 11.

When the front wall of the housing is closed, after insertion of a cassette 3, the jaws of guide-devices 43 are first adjusted symmetrically with the vertical plane containing optical copying axis OA by means of spindle 45, driven through a transmission 46, by stepping motor M6, until the distance b between the jaws is equal to the width of strip-material 6 contained in cassette 3. Thus, a specific number of switching steps for stepping motor M6 may be associated with each width of strip-material and slide-in compartment 2 may contain a coding device which is automatically adjusted to the codeword pertaining to the width of strip-material by means of a pin-strip arranged on cassette 3, but not shown in FIGS. 2-1, when the cassette is inserted. When the front wall of the housing is closed, the codeword is read, as a nominal value, through a lead 50, into nominal memory 49 in guide-positioning device 47, in whose actual-value memory 48, e.g. a so-called "constant" memory, the keyword for the actual distance b between the guide-jaws is stored. Positioning device 47 will then contain a counting circuit with a comparator which passes a number of positive or negative switching pulses of a pulse-generator G1, correspond to the difference between the nominal and actual value, to stepping motor M6. After counting these switching pulses, positioning device 47 releases, to a lead T, an L-signal, hereinafter called "T-signal", the appearance of which indicates that guide-jaws 44 are now correctly adjusted to the width of the strip-material used. This T-signal is used, in the circuit arrangement in FIG. 2, as a release signal for other switching circuits in the control device. The nominal value from memory 49 is also read as a new actual value into actual-value memory 48 with the said T-signal.

It is usually necessary for strip-material 6 to be placed already guided into first feed-element 11.

Arranged between compartment 2 and first feed-element 11 is a first guide-device, the jaws of which must be adjusted to strip-material width b corresponding to the selected picture-format, before the front wall of the housing is closed and before the strip-material is placed in the first feed-element. If the first guide-device is driven by a stepping motor, previously described positioning device 47 may be used for positioning the guide-jaws, in which case only the coded nominal values are to be fed in, not by inserting the cassette but in some other way. For the purpose of holding the pictures to be copied, the unit comprises a stationary retaining device (not shown in FIG. 1) into which the negative slide-in units, adapted to the different negative-formats, can be inserted. In the case of the fixed distance between the negative slide-in unit (object-point) and exposure-platform 24, there exist, between the negative-format, the picture-format and the focal-length of the objective, a definite relationship which can be determined, for example, by the copying scale, from copying formulae known in geometrical optics. Thus a specific picture-format corresponds to each combination of a specific negative-format (negative slide-in unit) and a specific objective (focal length), and thus a strip-material width corresponding to this picture-format. Preferably, therefore, the coded nominal values for positioning the guide-jaws are obtained by means of the negative slide-in units and by means of the interchangeable lenses provided for the different copying scales, in which case, as described hereinbefore in connection with the cassette, the retaining device may comprise a coding unit and each negative slide-in unit may comorise a pin-strip, in order to obtain the coded value for the relevant negative-format (negative width) by inserting a negative slide-in unit into the retaining device, the individual interchangeable lenses being equipped, for example with coding pins by means of which, when an objective is inserted into the holder located on wall 1c of the housing, a coding device arranged there is adjusted to the keyword for the relevant objective characteristic value (focal length). The two coding units may be connected to a simple computer which, in accordance with the previously mentioned relationships bewteen the three magnitudes, calculates the width of the strip-material from the values fed-in and supplies the correspondingly coded nomianl value for positioning the guides.

There are different design-variants for such an adjustment of strip-material widths, and additional control-functions may also be introduced without difficulty. For example, lens-changing can be monitored, in that the lens to be used is determined, from the predetermined negative-format and the desired pucture-format, by means of a table or a computer, the characteristic values of the lens thus determined, and the lens actually used, being compared with each other. If they do not agree, a signal-lamp may light up and the guide-positioning may be locked until the correct lens is fitted. Cassette-changing may be similarly monitored if compartment 2, as already indicated hereinbefore, contains a coding unit supplying the coded value for the width of the relevant strip-material.

If a stepping motor cannot be used to drive spindel 45, then incremental measurement of spindle revolutions is effected, for example by means of scale divisions, as known in mensuration technology.

Threading in Procedure

After a cassette 3 has been placed in compartment 2, the start of strip-material 6 is placed manually between rolls 13,15 of first element 11 of feed-device 10. As soon as the front wall of the housing is closed, the threading in procedure starts up fully automatically.

In order that strip-material 6 may not only be drawn out of cassette 3, but may also, if necessary, be wound back thereinto, drive-motors M1,M2 of feed-device 10 may have their direction of rotation reversed. The reversibility of asynchronous motor M1 is indicated in FIGS. 2-1 by a reversing switch US which switches-on asynchronous motor M1 by an L-signal to a control-input E1 with the direction of rotation for strip-material feed, in this case anti-clockwise, and by an L-signal to another input E2 with the direction of rotation for strip-material return, in this case clockwise. O-signals to inputs E1 and E2 switch asynchronous motor M1 off.

Stepping motor M2, in second feed-element 12, is adapted to be driven at a slow and at a fast rotational speed in both the one and the other direction. To this end, FIGS. 2-1 shows, for the sake of clarity, four pulse-generators G2,G3,G4,G5 which produce, for the low speed, positive and negative pulses at a low frequency (G3,G2) and, for the high speed, positive and negative pulses at a higher frequency (G5,G4), it being assumed that stepping motor M2 is rotated by positive pulses in order to feed the strip-material in anti-clockwise direction, and by negative pulses in order to return the strip-material in a clockwise direction. Also in FIGS. 2-1, switching elements SG 20, SG 30, SG 41, SG 50 and SG 51 are associated with pulse-generators G2, G3,G4,G5, each of which is adapted to switched to its control input, not described in detail, by an L-signal, in order to connect the relevant pulse-generator to stepping motor M2.

During the threading procedure, drive-motors M1,M2, which feed the strip-material, rotate in an anti-clockwise direction, stepping motor M2 at a lower rotational speed than asynchronous motor M1, thus forming in the strip-material the aforesaid loop 6s (FIG. 1). As long as this loop has not developed to its full length, and as long as the leading transverse edge of the strip-material has not reached sensor S5, the IR rays from sensors S1 and S5 are not interrupted by the said strip-material, and the said sensors release L-signals which, in the circuit arrangement shown in FIG. 2, are used, together with the previously mentioned T-signal (L) from guide-positioning device 47, to apply to control-input E1 to reversing switch US, and to the control-input to switching element SG 30, an L-signal, so that drive-motors M1, M2 rotate as desired. To this end, an AND-circuit A 30 precedes, for example, the control-input to switching element SG 30 in which the one input is connected to the signal-output from sensor S5 while the zecond input is engaged with the T-signal so that, in the case of an L-signal from sensor S5, AND-circuit 30 releases to switching element SG 30 and L-signal whereby pulse-generator G3, supplying positive pulses at low frequency, is connected to stepping motor M2. The L-signal released by AND-circuit A 30 is therefore an indication that stepping motor M2, which feeds the strip-material, is rotating in an counter-clockwise direction, and it is applied, through and OR-circuit OR 2, to one input to an AND-circuit A 11 contained in loop-regulating unit 52. Another input to this AND-circuit 11 is connected to the signal-putout from sensor S1, while a third input, which serves to switch-off loop-regulating unit 52 under specific operating conditions, otherwise carries an L-signal, so that when loop 6s is not fully developed, it releases, through an L-signal from Sensor S1 and AND-circuit A 11, an L-signal to control-input E1 of reversing switch US, and asynchronous motor M1 rotates in the desired direction. As soon as the said loop has become long enough for the apex 6s′ thereof to interrupt the IR ray of sensor S1, AND-circuit A 11 releases, to control-input E1, an O-signal which switches off drive-motor M1. Loop 6s is thus held to a predetermined length during the feeding of strip-material 6.

The said strip-material continues to be advanced by stepping motor M2, until the leading transverse edge interrupts the IR ray of sensor S5 (FIG. 1). The O-signal thus produced by sensor S5 switches off circuit element 30 through AND-circuit A30 and disconnects pulse-generator G3 from stepping motor M2. The latter is now switched over to the high feed-velocity and strip-material 6 is advanced further over a predetermined length, the length being equal to the previously mentioned distance m between sensor S5 and cutting plane SE (FIG. 1) or blade-edge 38k, and is therefore equal to a predetermined number of stepping-switch pulses for stepping motor M2. As soon as steppting motor M2 has rotated by this predetermined number of steps, leading transverse edge 6k of the strip-material (FIG. 3) lies at blade-edge 38k and stepping motor M2 is switched off.

A strip-material positioning device BP is provided to position strip-material 6. In the circuit arrangement according to FIGS. 2-1, the signal output from sensor S5 is connected to an inverting input to a further AND-circuit A 50, the other input to which is connected to signal-output A1 from a counting unit Z1. The latter is arranged in such a manner that, for example, after being triggered, it releases, e.g. through a T-signal (L), at the output, an L-signal which, after a nominal number of pulses, stored in a fixed memory, have been counted off, changes into an O-signal. In this case, counting unit Z1 is preset to the number of switching steps corresponding to distance m or the feed-length, and it initially delivers an L-signal to AND-circuit A 50 so that, at an O-signal from sensor S5, the said AND-circuit carries an L output signal by means of which an additional switching element SG 50, and an auxiliary switch H1 connected in series therewith, are switched on. Switching on switching element SG 50 and auxiliary switch H1 connects pulse-generator G5, producing positive pulses at a higher frequency, is connected to stepping motor M2, so that the latter feeds the strip-material at the higher speed. Stepping motor M5 then continues to rotate until counting unit Z1 has counted off the predetermined number of steps whereupon, with an O output-signal from the counting unit, stepping motor M2 is switchoff by switching off switching element SG 50. After stepping motor 2 has thus been halted, drive-motor M1 may continaue to rotate until loop 6s of strip-material 6 has reached its predetermined length, whereupon motor M1 is also switched off. This compltes the threading-in programme. Leading transverse edge 6k of strip-material 6 is now located, as previously mentioned, at blade-edge 38k, while roller-blind shutter 32 (FIG. 1, FIG. 3) is in its neutral position with both curtains 35,36 in the lower closed position, thus protecting the strip-material against exposure.

Exposure Procedure

Picture 31 to be copied is projected onto closed curtain 35 of roller-blind shutter 32 (FIG. 3). As soon as the adjustment is correct, exposure is initiated by an exposure-signal. This is produced, for example by actuating a signal-generator SB (FIGS. 2—2) which releases an L-signal, for example through and AND-circuit A 100, to a line 53, until it is reset by a reset signal. By means of AND-circuit A 100, conditions can be introduced to bring the exposure-signal into effect, e.g. an existing T-signal, L-signal from sensor S5, etc..

As soon as an expsoure is initiated, photographic strip-material 6 is moved back upwardly on exposure-platform 24 until transvserse leading edge 6k of the strip-material comes to a stop slightly above lower edge 31 uk of projected picture 31, which comes to pass after the said strip-material has moved back over a distance k−½ (FIG. 1), k being the already mentioned fixed distance between cutting plane SE and optical copying axis OA, and 1 being the length of the selected picture-format. At the same time, a vacuum is produced in chamber 26, in that, with fan 27 switched on, slats 29 are set to the open position by means of drive-element 30.

As shown diagrammatically in FIGS. 2—2, drive-element 30 may be switched on by the exposure-signal (L-signal) fed through line 53 to one input E3, for opening slats 29, and may be switched off by a signal to another input E4 for closing the said slats.

The backward movement of strip-material 6 is preferably effected in a manner similar to its forward movement over the distance m: with the exposure signal (L-signal) in line (FIGS. 2-1), switching element SG41 and aixiliary switch H3 are switched on through AND-circuit A 41 and negative pulses from pulse-generator G4 are applied to stepping motor M2, causing it to rotate in a clockwise direction. Of these pulses, the number corresponding to the distance $k-\frac{1}{2}$ is counted by counting unit Z3. After the predetermined number of pulses has been counted off, a signal-change L/O takes place at output A3, as in the case of counting unit Z1, the appearance of the O-signal indicating that the strip-material is correctly adjusted for exposure, and the output-signal from counting unit Z3 may therefore be used to initiate the actual exposure procedure. Output A3 from counting unit Z3 is therefore connected, through a line 54, to the additional switching part, shown in FIGS. 2—2, of the control-unit, the curtain-positioning device VP.

As soon as strip-material 6 has assumed its correct position on exposure-platform 24, upper curtain 35 (FIG. 1, FIGS. 3 and 4) is moved upwardly by an accurately determined dictance, out of its neutral position, by rotating roller 33 in a clockwise direction, the said distance being equal to the sum of half the length 1 of the selected picture-format and the already mentioned distance (FIG. 1) between the closing edge 35$k$ of this curtain, when the roller-blind shutter is in its neutral position, and the optical copying axis OA. Upper shutter-curtain 35 is moved upwardly by causing stepping motor M3, which drives curtain-roller 33, to rotate in a clockwise direction, as a result of which it carries out a number of half-steps corresponding to the distance $z+\frac{1}{2}$. After stepping motor M3 comes to a halt, closing edge 35$k$ of curtain 35 lies accurately at distance $\frac{1}{2}$ above copying axis OA. In this exposure-position, closing edge 35$k$ of curtain 35 serves as a mask limiting the upper edge of the exposed picture, which must always be somewhat smaller than projected picture 31. Lower shutter-curtain 36 is set in motion after upper curtain 35 at a time equal to the exposure-time set and also travels upwardly by the distance $z+\frac{1}{2}$. When lower curtain 36 reaches upper curtain 35, roller-blind shutter 32 is closed in the upper closed position and the actual exposure is ended.

In order to rotate rollers 33,34 in a clockwise direction, as required, for the purpose of raising shutter curtains 35,36, stepping motors M3, M4 (FIGS. 2—2) are adapted to be connected, through switching elements SG 71 and SG 72, and auxiliary switches H4,H5, to a pulse-generator G7 delivering negative pulses. This causes the stepping motors to rotate in a clockwise direction with half steps, the switches, as already described hereinbefore in connection with stepping motor M2, being adapted to be actuated by AND-circuits A 71, A 72, and the switching steps for stepping motors M3,M4 being adapted to be counted by counting units Z4,Z5. In the case of each AND-circuit A 71,A72 there lies, at one input, exposure-signal B fed through line 53, and, at an inverting input, the output signal from counting unit Z3 fed through line 54, by which switching elements SG 71, SG 72, and auxiliary switches H4,H5, can be closed only if the strip-material is correctly positioned, while a third input is connected to output A4,A5 of counting unit Z4,Z5. In the circuit for stepping motor M4 for lower curtain 36, switching element 72 is followed by a delay-circuit V adjustable to the exposure-time. After counting unit Z5 has counted off the set number of half steps, a signal-change L/O takes place at its output A5, the occurrence of which indicates that the exposure has taken place. For the purpose of processing this signal, output A5 of counting unit Z5 is also connected to a line 55.

After roller-blind shutter 32 has closed, the vacuum in chamber 26 is eliminated by closing slats 29 and strip-material 6 is simultaneously moved downwardly with shutter-curtains 35,36. Stepping motors Mr,M4, now rotating rollers 33,34 (FIG. 1) of curtains 35,36 in an anti-clockwise direction, come to a halt as soon as the curtains reach their lower neutral positions, as monitored by sensors S3,S4. Strip-material 6 is advanced still further downwardly, from the exposure position, altogether by the exact distance $k+\frac{1}{2}$, so that the exposed section now comes to rest exactly under cutting plane SE. As soon as the strip-material has assumed this position, moving blade 39 of separating device 37, driven by a motor M5 through a control 40S, cuts the first exposed sheet from the remainder of the strip-material.

For the purpose of moving shutter-curtains 35,36 downwardly, the positive "half-step" pulses produced by a pulse-generator G6 (FIGS. 2—2) are applied, through switching elements SG 61,SG 62, to stepping motors M3,M4. In the case of relevant AND-circuits A 61,A62, one input to each is engaged, through line 53, with the exposure-signal (L-signal), an inverting input is connected, through line 55, to output A5 from counting unit Z5, and a third input is connected to the signal-output from sensors S3 or S4 which is assumed to carry only an O-signal when the relevant curtain 35 or 36 is in its neutral position, i.e. its lower closed position. Also connected to line 55 are input E4 to drive 30 for slats 29 and an inverting input to an AND-circuit A 51 (FIGS. 2-1). In the case of this AND-circuit A 51, an input is again engaged with line 53 for the exposure-signal, and a third input is connected to output A2 from a counting circuit Z2. An L-output signal from AND-circuit A 51 switches on a switching element SG 51 and an auxiliary switch H2, by means of which the positive "full-step" pulses from the above-mentioned pulse-generator G5 may be applied to stepping motor M2.

Signal-change L/O appearing, appearing when the roller-blind shutter is closed, at output A5 from counting unit Z5, then switches off drive 30 (FIGS. 2—2), so that slats 29 close and the vacuum in chamber 26 (FIG. 1) disappears. Stepping motors M2,M3,M4 start to rotate in an anti-clockwise direction, so that shutter-curtains 35,36, together with strip-material 6, are moved downwardly. Signal-change L/O, appearing, when curtains 35,36 enter the neutral position, at the output from sensors S3,S4, allows stepping motors M3,M4 (FIGS. 2—2) to stop by opening switching elements SG 61,SG 62, and finally, when counting unit Z2 (FIGS. 2-1) has counted off the necessary number of switching steps to advance the strip-material over the distance $k+\frac{1}{2}$, the O-signal appearing at output A2 switches off switching element SG 51 through AND circuit A 51, whereupon stepping motor M2 also comes to a halt. Signal-change L/O, at output A2 from counting unit Z2, thus shows that the strip-material has now been pushed into separating device 37 in the correct position for cutting off the exposed picture.

Separating device 37 (FIG. 1, FIGS. 2—2) is arranged, for example, in such a manner that an L-signal at control-inout E3 (FIGS. 2—2) switches on motor M5 to produce a parting cut with mobile blade 39. Completion of the cut is reported by a signal at output A6. As shown in FIGS. 2—2, control-inout E3 may be preceded by an AND-circuit A 90, in which an input is engaged with line 53 for the exposure-signal and an inverting input is connected, through a line 56, to output A2 (FIGS. 2-1) from counting unit Z2. Thus signal-change L/O at output A2 switches on separating device 37 and, after the exposed picture has been cut off, a signal appears at output A6 which is used to reset exposure-signal generator SB. Resetting the said signal-generator changes the outputsignal from AND-circuit A 100 from L to O, thus completing the exposure procedure. Stepping motors M2,M3,M4 are then switched off again amd strip-material 6, and shutter-curtains 35,35, are located in the starting positions shown in FIG. 3. A new exposure-cycle may be initiated by reactivating signal-generator SB.

Before each exposure, strip-material 6 is moved back from its starting position over a distance $k-\frac{1}{2}$ and, after the exposure, is moved forward over the diatance $k+\frac{1}{2}$. During each displacement of the strip-material, loop 6s (FIG. 1) is regulated by sensor S1, loop-regulating device 52 (FIGS. 2—2), and roll 13 driven by asymchronous motor M1, in such a manner that it retains its predetermined length. When strip-material 6 is moved downwardly, i.e., in the direction of feeding, asynchronous motor M1 is allowed to rotate in an anticlockwise direction until sensor S1 responds, i.e., by changing its output signal from L to O. When strip-material 6 is moved back upwardly, asynchronous motor M1 is allowed to run in a clockwise direction until sensor S1 no longer responds, i.e its output-signal changes from O to L. Strip-material 6 is thereby returned to cassette 3 by rewind motor MO. Since, as already described hereinbefore, rewind motor MO is coupled, through a slipping clutch 9 (FIG. 1), to shaft 8 carrying storage roll 7, rewind motor Mo rotates in only one direction, in this case in an counter-clockwise direction for example and, for regulating loop 6s, while the strip-material is being returned, it need only be switched on and off. This is is indicated in FIGS. 2-1 by an on-and-off switching device 51 which is actuated by control-signals at its control-input E4.

Regulation of the loop, during the feeding of the strip-material has already been described, by way of example, in connection with the threading procedure, where it was indicated that loop-regulating device 52 (FIGS. 2—2) contains a first AND-circuit A 11 in which one input is connected to the signal output from sensor S1 and another input always carries an L-signal when stepping motor M2, of second strip-material feed-element 12, rotates in a counter-clockwise direction. To this end, an OR-circuit OR2 may be connected to this input, in which one input is connected to the output from AND-circuit A 30 and another input is connected to the output from AND-circuit A 51, so that OR-circuit OR2 always releases an L-signal when positive switching pulses from pulse-generator G3 or pulse-generator G5 are applied to stepping motor M2, through switching element SG 30 or SG 51, to cause the said motor to rotate in an anti-clockwise direction. With an L output-signal from AND circuit A 11 at control-input E1 to reversing switch US, asynchronous motor M1 then rotates in an anti-clockwise direction until sensor S1 responds with a signal-change from L to O, i.e. loop 6s (FIG. 1) has extended precisely to the predetermined length.

Loop-regulation during return of the strip-material is effected by means of a second AND-circuit A 12. The signal-output from sensor S1 is connected to an inverting input to this AND-circuit A 12 and a non-inverting input thereto is always engaged with an L-signal when stepping motor M2 rotates in a clockwise direction in order to return the strip-material. To this end, this non-inverting input may be conected to the output from a further OR-circuit OR3, in which one input is connected with the output from an AND-circuit A 20, to be described hereinafter in greater detail, while a second input is connected to the output from AND-circuit A 41. An L-signal therefore appears at its output when stepping motor M2 is connected, through switching element SG 20 of SG 41, to pulse-generator G2 or G4 delivering negative switching pulses for clockwise rotation. The output from OR-circuit OR3 is connected to an input to an AND-circuit A 01, the other input to which is engaged, for example, with the already mentioned T-signalling correct adjustment of guide-device 43, while the output therefrom is connected to control-input E4 of on-and-off switching device 51 for rewind motor MO. As soon as stepping motor M2 is switched on to return the strip-material by rotating in a clockwise direction, asynchronous motor M1, for the return of the strip-material, is switched on by the L-signal released by OR-circuit OR3 through ANDcircuit A 01 and on-and-off switching device 51 for rewind motor MO, and by an L-signal from AND-circuit A 12 which is applied, through OR-circuit OR1, to control-inout E2 of reversing switch US, the asynchronous motor M1 then rotating in the clockwise direction until sensor S1 responds, as the length of loop 6s decreases, with a signal-change from O to L, i.e., loop 6s is shortened precisely to its predetermined length.

OR-circuit OR1 and the inverting third inputs provided in loop-regulating deice 52 in FIGS. 2-1 and in AND-circuits A 11, A 12, take into account the threading-out procedure provided in this device and described below.

Threading-Out Procedure

When the photographic strip-material is to be changed or spliced, or in the event of a defect, a release-signal automatically threads the strip-material out of the device and winds it back into cassette 3.

During threading-out, stepping motor M2 of second feed-element 12 (FIG. 1) runs at the low speed in reverse, loop 6s being regulated by loop regulating devoce 52. As soon as transverse edge 6k of the strip-material passes sensor S5, the latter responds and device 52 is switched off so that, from then onwards, rolls 13, 14 can be rotated by drive-motors M2, M1 only in the clockwise direction. Since driven roll 14 of second feed-element 12 rotates at a lower speed than driven roll 13 of first feed-element 11, loop 6s is used up. Thereafter, as soon as sensor S2 detects the end of strip-material 6, drive-motor M1 comes to a halt. The front wall of the housing may then be opened, pressure-roll 15 above eccentric 19 may be lifted, and cassette 3 may be withdrawn from slide-in compartment 2.

In order to anable this threading-out procedure to be implemented, the circuit-arrangement shown in FIGS. 2-1 comprises a threading-out signal-generator SR which releases an L-signal as a threading-out signal, for example only while a key is depressed, the advantage of this being that the threading-out procedure may be interrupted at will. The output from signal-generator SR is connected to one input to previously mentioned AND-circuit A 20, in which a second input is engaged with the T-signal from guide-positioning device 47, while an inverting input is connected to the output from sensor S2. When the strip-material is drawn in, sensor S2 releases an O-signal, and when signal-generator Sr is then actuated, AND-circuit A 20 delivers an L-signal whereby rewind motor MO is switched on through OR-circuit OR3 and, through the now switched-on switching element SG 20, pulse-generator G2, which produces negative pulses at a low frequency, is connected to stepping motor M2. The latter begins to rotate, in order to return the strip-material, at low speed in a clockwise direction, loop 6s of strip-material being regulated in the manner described hereinbefore.

In the case of another AND circuit A 13, one input is connected to the signal-output from sensor S%, another input is connected to the signal-output from threading-out signal-generator SR, and an inverting input is in turn connected to the signal-output from sensor S2. The output from AND-circuit A 13 is connected to the inverting inputs to the AND-circuits in loop-regulating device 52 and to another input to the above-mentioned OR-circuit OR1. When signal-generator SR is actuated and the strip-material, moved slowly upwardly by stepping motor M2, passes sensor S5, thus changing the output-signal therefrom from O to L, AND-circuit A 13 releases an L-signal which, through the inverting inputs to AND-circuits A 11, A 12, switches off loop-regulating device 52 and, through OR-circuit OR1, asynchronous motor M1 of first feed-element 11, for the return of the strip-material, is, or remains, switched to clockwise rotation. Finally, when transverse edge 6k of the said strip-material passes sensor S2 and changes the output-signal therefrom O to L, motors M1, M2, M0 are switched off by AND-circuits A 13 and A 20 which are then releasing O-signals.

As indicated, the circuit arrangement described hereinbefore is merely an example provided in order to explain the procedures involved in sundry positionings of the strip-material and shutter-curtains. In practice, however, the said circuit arrangement may properly be otherwise designed in part. For instance, the circuit-arrangement shown comprises auxiliary switches H1 . . . H5, the sole purpose of which is to separate the different current-paths from each other and to reactions, and which may therefore be replaced by other, more practical means. Counting units Z1 . . . Z5 are of identical design and differ only with respect to the nominal valued stored: m, $k \pm \frac{1}{2}$, $z + \frac{1}{2}$. In a practical circuit-arrangement, the number of counting units may, of course, be sharply reduced, as long as care is taken to ensure that the respective counting unit is switched on at the right moment with the necessary nominal value. In this case, the variable is only the frame-length 1, the nominal value for which can preferably be fed in, for example, by actuating a frame-length selector switch. Pulse-generators G1 . . . G6 are combined, in practice, into a circuit-arrangement which, controlled by control-signals, delivers the required pulse-sequence. The correct sequence of individual positionings is effected, in the circuit-arrangement shown, by means of AND- and OR-circuits which facilitate clear representation. The control-device is preferably assembled from commercially available microprocessors, selected in accordance with the operating programme in question.

The operating programme of the circuit-arrangement may also be varied. It is desirable, however, tomaintain the given neutral position of the strip-material, in which transverse edge 6k thereof is located at cutting edge 38k of separating device 37, since this provides the simples positioning of the strip-material for exposure on the exposure-platform, in the event of a change in picture-format, and there is no need for any intermediate positioning. On the other hand, for example, moving the strip-material to the neutral position during threading-in may be modified in such a manner that, after detection by sensor S5, the said strip-material is not advanced by the distance between cutting edge 38k and sensor S5, but by a distance m+x, x being the length of the initial strip of material which usually projects from the cassette and is therefor useless. However, in this case the threading-in procedure must be completed by an additional parting operation, but this produces a saving in strip-material, above all if, with different strip-widths, only relatively short pieces are used.

It may also be desirable to modify the operating programme of the device described in such a manner that when closed roller-blind shutter 32 is in its neutral position, shutter-curtains 35,36 are in their upper terminal positions and, when a section of strip-material is exposed, are moved consecutively downwardly at an interval corresponding the the exposure-time. In order to ensure that, in this case also, the upper edge of the exposed picture is correctly masked by the roller-blind shutter, at the beginning of the exposure procedure, closing edge 35k of upper shutter-curtain 35 is spaced from otical copying axis OA by a distance amounting to exactly half of frame-length 1. During the exposure, lower shutter-curtain 36 is initially moved downwardly until closing edge 36k thereof is spaced from optical copying axis OA by the distance z (FIG. 1) and is therefore located slightly below leading transverse edge 6k of strip-material 6. This reliably eliminates any shading of the lower edge of the pictures by shutter-curtain 36. Upper shutter-curtain 35 then moves down until the roller-blind shutter is closed. Thereafter, shutter-curtains 35,36 are returned together, i.e. with the roller-blind shutter closed, to their starting and neutral positions. In this variant, sensor S3, for monitoring the neutral position of upper shutter-curatin 35, must obviously be arranged above exposure-platform 24.

The foregoing examples of modifications show that the device according to the invention may be adapted, without any difficulty, to different requirements, in order to achieve optimal efficiency.

I claim:

1. A device for exposing photographic strip material in consecutive sections of predetermined format and for separating the exposed sections into marginless copies for further processing, said device having an exposure platform perpendicular to an optical copying axis of an optical copying device; a roller-blind shutter located immediately in front of said exposure platform with two curtains, each adapted to be moved along a path by means of a curtain roller and each comprising a closing edge running at right angles to said path and adapted to move across the exposure platform; a separating device which includes a cutting location at a fixed, predetermined distance from said optical axis; and a feed device for the strip material, said feed device containing a positioning roll operated by a drive motor, whereby said strip material is adapted to be fed along a track running along the path of the shutter curtains, across the exposure platform, and to said separating device, wherein the roller-blind shutter also serves as a picture-defining mask, to which end the rollers of the two shutter curtains are adapted to be operated by two drive motors through a curtain-positioning device which is arranged to move the shutter curtain more remote from the separating device into an exposure position in which its closing edge is half a frame length away from the optical copying axis, in the direction of said separating device, in order to mask the section of strip material at the edge of the picture more remote from said separating device, and in that the positioning roll of the feed device for the strip material is adapted to be operated by its drive motor through a strip material positioning device which is arranged to position the strip material, when the roller-blind shutter is closed and before a section of strip is exposed, in an exposure position in which the transverse edge of the strip material, leading in the direction of feeding, is spaced from the optical copying axis by half a frame length in the direction of the separating device and, after a section of strip material has been exposed, to advance said strip material, in order to position the exposed section in said separating device, by one feed length which is equal to the sum of the half frame length and said fixed distance between the cutting location of said separating device and the optical copying axis, and thereafter to actuate said separating device, and wherein the strip material positioning device is also arranged to move said strip material, for the purpose of exposing a first section of the strip, from a neutral position where said leading transverse edge of the strip material lies at said cutting location of the separating device, and for exposing each additional section after the separating operation, back out of the same neutral position, by a distance equal to the difference between the distance between the cutting location and the optical copying axis, and the half frame length, into the exposure position on the exposure platform.

2. A device according to claim 1, characterized in that the drive-motor (M2) for the positioning roll (14) of the feed-device (10), and the drive-motors (m3,M4) for the curtain-rollers (33,34) of the roller-blind shutter (32), are stepping motors.

3. A device according to claim 1, characterized in that the curtain-rollers (33,34) of the roller-blind shutter (32) are of the same diameter.

4. A device according to claim 3, characterized in that the diameter (D) of the curtain-rollers (33,34) is twice the diameter (d) of the positioning roll (14) of the feed-device (10).

5. A device according to claim 4, characterized in that the circumference of each curtain-roller (33,34) amounts to 25/3" while the circumference of the positioning roll (14) amounts to 25/6".

6. A device according to claim 2, characterized in that the stepping motor (M2) which drives the positioning roll (14) is operated with full steps, while the stepping motors (M3,M4) which drive the curtain-rollers (33,34) are operated with half steps.

7. A device according to claim 2, characterized in that when the positioning roll (14) is operated, and when the curtain-rollers (33, 34) are operated, by the stepping motors (M2,M3,M4), the strip-material (6), and the shutter-cutains (35,36), are adapted to move in steps of 1/48".

8. A device according to claim 1, characterized in that the maximum travel of each shutter-curtain (35,36) is, at the most, equal to the circumference of its curtain-roller (33 or 34), while each shutter-curtain (35,36) wraps around its curtain-roller (33,34) at the most once without overlapping.

9. A device according to claim 1, characterized in that the shutter-curtains (35,36) are made of spring-steel sheet, and the shutter-curtain which masks the edge of the picture (31 ok) remote from the leading transverse edge (6k) of the strip-material (6), has a sharp closing edge (35k) bearing closely against the said strip-material.

10. A device according to claim 1, characterized in that the device for feeding the strip-material comprises a first feed-element (11) with a feed-roll (13) operated by a drive-motor (M1), a pressure-roll (15) which can be raised to insert the strip-material (6), and a second feed-element (12) containing the positioning roll (14); in that the said positioning roll is adapted to be operated by its drive-motor (M2) for a predetermined strip-material velocity, while the feed-roll (13) is adapted to be operated by its drive-motor (M1) for a higher strip-material velocity; in that the positioning roll (14) and the feed-roll (13) are arranged in such a manner as to form, out of the strip-material, a loop (6s) hanging freely down between the two rolls (13,14); in that deflecting means (16, 21) are associated with the positioning roll (14) in order to guide the transported strip-material (6) from the said positioning roll in a vertically downward path; and in that the exposure-platform (24) is arranged below the feed-device (10) with a copying plane located in the plane of the vertical path of the said strip-material, the separating device (37), arranged below the roller-blind shutter (32), comprising a stationary blade (38) having a horizontal cutting edge (38k) located in the plane of the path and a mobile blase (39) operated by a drive-motor (M5).

11. A device according to claim 10, characterized in that arranged below the feed-elements (11,12) is a first sensor (S1), more particularly an IR light-barrier, for detecting the apex (6s') of the loop, the drive-motor (M1) for the feed-roll (13) being connected to a loop-regulating device (52) which is arranged to switch-on the drive-motor (M1) for the feed-roll (12), upon receiving control-signals from the said first sensor to form the loop (6s), in the same direction of rotation as the positioning roll (14), and to switch the said motor off as soon as the loop has reached a predetermined length.

12. A device according to claim 11, characterized in that arranged between the feed device and the exposure platform, at a fixed, predetermined distance form the cutting location of the separating device, is a further sensor, more particularly an IR light barrier, for detecting the leading transverse edge of the strip material, the strip material positioning device being arranged so that when said strip material is threaded-in and as soon as a second sensor detects the leading transverse edge of the strip material, the latter is advanced, by a feed length equal to the distance between said second sensor and the cutting location, to said neutral position.

13. A device according to claim 12, characterized in that the strip-material positioning device (BP) is arranged so that when the strip-material is threaded-in and before its leading transverse edge (6k) is detected by the second sensor (S5), the positioning roll (14) is operated by its drive-motor (M2) at a predetermined strip-material velocity and, afte detection of the said leading transverse edge, at a higher strip-material velocity, until the neutral position of the said strip-material is reached.

14. A device according to claim 1, characterized in that when the roller-blind shutter (32) is closed, the closing edges (35k, 36k) of the shutter-curtains (35,36), in their neutral positions, are at a distance (z) from the optical copying axis (OA) which is greater than half a maximal frame-length ($1_{max}$), and in that the curtain-positioning device (VP) is arranged, in order to expose a section of the strip, to move the leading shutter-curtain (35) by a distance equal to the sum ofthe said distance (z) and half a selected frame-length (1), and to move the following shutter-curtain (36), after a time-delay determined by the selected exposure-time, by the same distance, and thereafter to return the two shutter-curtains (35,36) together, with the roller-blind shutter (32) closed, to their neutral positions.

15. A device according to claim 14, characterized in that a sensor (S3,S4) is associated with each of the shutter-curtains (35,36) for detecting its neutral position, while the curtain-positioning device (VP) is arranged, when the shutter-curtains (35,36) are returned to their neutral positions, to shut off the drive-motors (M3,M4) of the curtain-rollers (33,34), as soon as the sensors (S3,S4) detect the neutral positions.

16. A device according to claim 1, characterized in that a rewind motor (MO) is present and is adapted to be coupled, through a slipping clutch (9), to a shaft (8) carrying a supply-roll (7) in a cassette (3), and in that the strip-material positioning device (BP) is arranged to switch on the rewind motor (MO), in order to move the strip-material back, when the positioning roll (14) rotates in a direction which will move the strip-material back.

17. A device according to claim 1, characterized in that located in particular between the feed-device (10) and the exposure-platform (24) is a guide-device (43) with jaws (44) adjusted to the width of the strip-material (6), in order to guide the said strip-material laterally during its transportation and to hold it in a laterally symmetrical position in relation to the optical copying axis (OA).

18. A device according to claim 17, characterized in that, in the guide-device (43), the jaws (14) are central-symmetrically adjustable by guide-means (45,M6), the said guide-means being controlled by a guide-positioning device (47) which is arranged to adjust the gap (b) between the said jaws automatically to the width of the strip-material (6) inserted in the feeding direction.

* * * * *